G. A. JEREMIAH.
Street-Sprinkler.

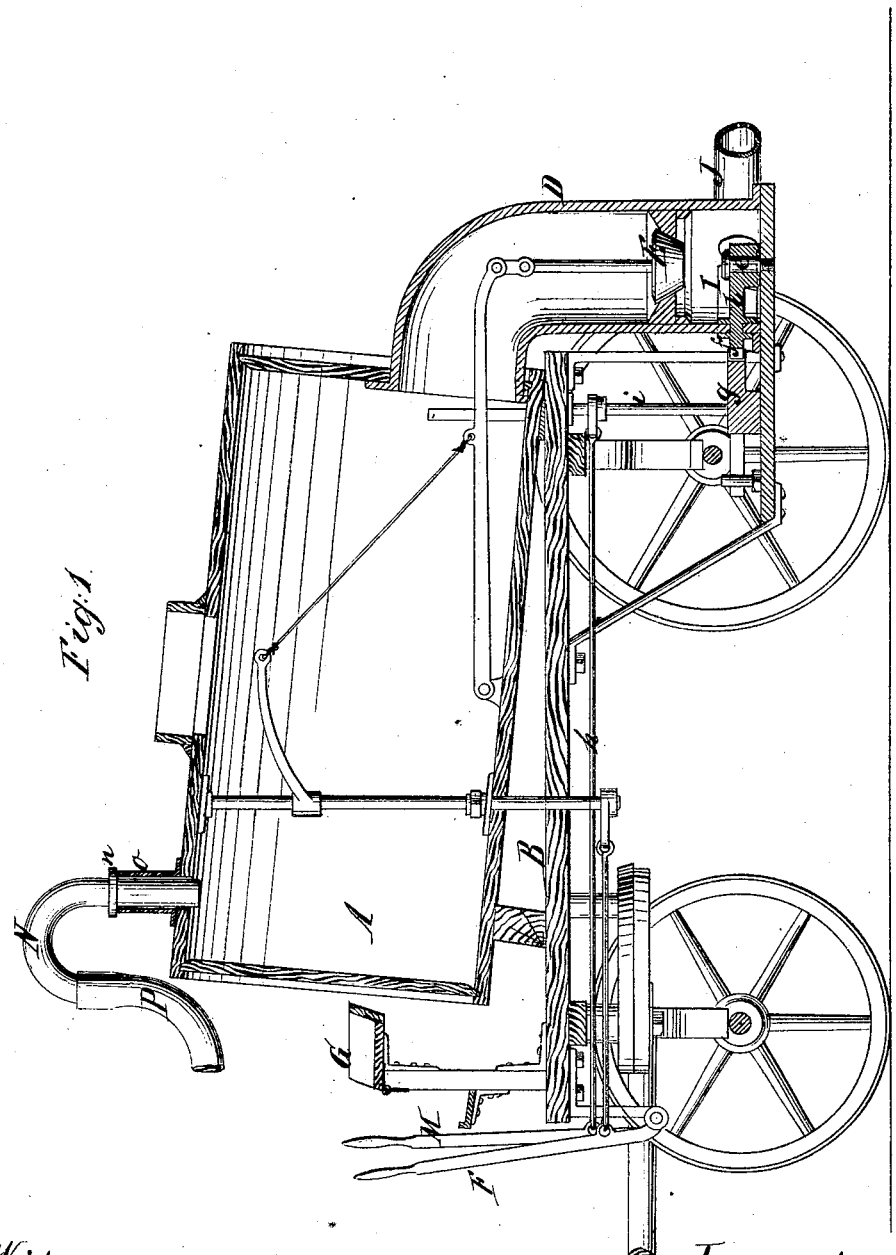

No. 159,182.

2 Sheets--Sheet 2.

Patented Jan. 26, 1875.

Witnesses:
Ernst Bilhuber
Chas. Wahlers.

Inventor:
George A. Jeremiah
Van Santvoord & Hauff
Attys

UNITED STATES PATENT OFFICE.

GEORGE A. JEREMIAH, OF NEW YORK, N. Y.

IMPROVEMENT IN STREET-SPRINKLERS.

Specification forming part of Letters Patent No. 159,182, dated January 26, 1875; application filed December 17, 1874.

*To all whom it may concern:*

Be it known that I, GEORGE A. JEREMIAH, of the city, county, and State of New York, have invented a certain new and Improved Street-Sprinkler, of which the following is a specification:

This invention is illustrated in the accompanying drawing, in which—

Figure 3:
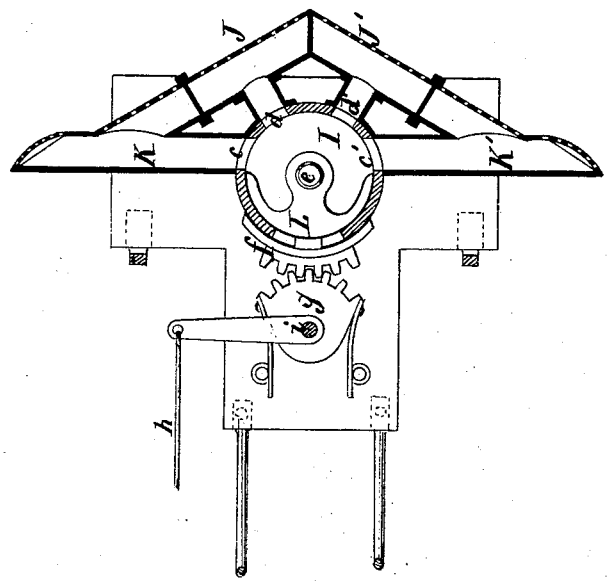
Figure 2:
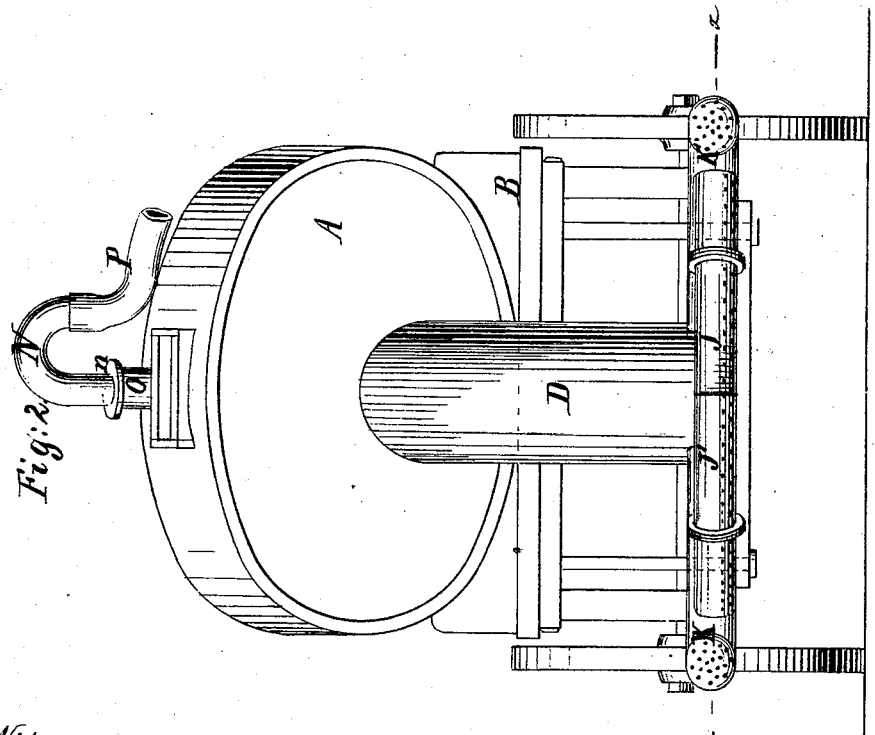

Figure 1 represents a longitudinal vertical section. Fig. 2 is an end view. Fig. 3 is a horizontal section of the sprinkling-tubes in the plane $x\,x$, Fig. 2.

Similar letters indicate corresponding parts.

This invention relates to certain improvements in street-sprinklers; and it consists of a peculiar construction and combination of parts, which are fully hereinafter described in detail and specifically pointed out in the claims.

In the drawing, the letter A designates the water reservoir or tank of my sprinkling apparatus. This tank is made in the form of an oval, as shown in Fig. 2 of the drawing, so that when the apparatus is driven over a rough pavement the splashing of the water is materially reduced. Said tank is placed flatwise on a platform, B, which is supported by four wheels, and its front end is raised so that it carries the water down to the leader more steadily than it can be done by either box or cask; and, furthermore, my tank allows of carrying the same amount of water as would a round or square tank of the same capacity with less loss of fountain-head pressure in the outflow. The leader D is made in the shape of an elbow, which extends from the back of the tank, and which carries the water back far enough to have no interference from the hind wheels. At the same time my leader brings the descending column of water in a perpendicular line, or nearly so, thus furnishing the maximum pressure as against inclined discharge-tubes extending from the bottom of the tank backward to the sprinkling-head. In the leader, near to its bottom end, is situated the stop-valve E, which can be raised by a lever, F, from the driver's seat G. By placing this stop-valve close to the bottom end of the leader the fluid used for sprinkling is economized, since, if the valve is placed at or near the bottom of the tank, as heretofore practiced, every time the valve is closed (which must be done in passing over cross-walks and footpaths) all the fluid contained in the leader or leaders running from the bottom of the tank to the sprinklers is wasted; and, furthermore, by my invention, the dribbling of cross-walks and footpaths is avoided. The seat of the valve E is, by preference, on the top of the sprinkler-head. The sprinkling-head I occupies a position about or nearly level with and in close contiguity to the sprinkling-jets, and has many advantages over any contrivance at or near the tank bottom, since, by means of a proper capacity of said head and its connections above, a supply of water is brought to, and all the time kept near, the sprinkling-jets; also, the fluid is held in check or allowed to pass to the sprinkling-jets at the will of the driver by a proper valve, as will be presently explained. Said sprinkling-head has, by preference, four outlets, $c\ c'\ d\ d'$, the outlets $d\ d'$ for supplying the sprinkling-tubes J J', which wet mainly behind the vehicle, and the outlets $c\ c'$, for supplying the tubes K K', serving for side outflow. The outlets $d\ d'$ and sprinkling-tubes J J' may, however, be dispensed with, and in this case the rear portion of the sprinkling-head itself is perforated with a number of holes to form jets for distributing the water back of the vehicle. Between the outlets $c\ c'$ is situated a valve, L, best seen in Fig. 3. This valve turns on a pivot, $e$, or otherwise, and it connects with a toothed segment, $f$, which gears in another toothed segment, $g$, to which an oscillating motion can be imparted by a lever, M, from the driver's seat. The connection between this lever and the segment is effected by a rod, $h$, and rock-shaft, $i$, or by any other equivalent means. By turning the valve L in one direction the outlet $c$ is shut off, and by turning it in the opposite direction the outlet $c'$ can be closed. By these means the driver is enabled to shut off either of the side outflows in passing close to a sidewalk or near to a coach or other article standing or passing in the street.

The sprinkling-tubes J J' are, by preference, made oval, so as to allow more jets than round ones. They are set at an angle of about thirty degrees (more or less) toward the side tubes K K', in order to obtain the largest possible spread of water.

For the purpose of filling the tank I use a bent pipe, N, which is provided with a collar, n, to rest on the mouth of a tube, O, that rises from the top of the tank, so that said bent pipe can be freely revolved in either direction. Said pipe is attached to a piece of hose, P, which serves to make the connection with the hydrant.

This whole appliance is so constructed that it can be conveniently carried from place to place with the vehicle and turned from side to side, as desired.

What I claim as new, and desire to secure by Letters Patent, is—

1. The combination, in a street-sprinkler, of the tank A, leader D, sprinkling-head I, having the outlets c c' and the sprinkling-tubes K K' communicating with and projecting laterally from the sprinkling-head, substantially as shown and described.

2. The leader D projecting downwardly from the rear end of the tank, and provided at its lower end with the sprinkling-head I, having the outlets c c', in combination with the lateral tubes K K' and the valve L, arranged to move within the sprinkling-head, substantially as described, for the object specified.

3. The combination of a cut-off valve, L, with the sprinkling-head I, side tubes K K', tank A, and lever M, substantially as and for the purpose set forth.

In testimony that I claim the foregoing I have hereunto set my hand and seal this 15th day of December, 1874.

GEORGE A. JEREMIAH. [L. S.]

Witnesses:
 W. HAUFF,
 E. F. KASTENHUBER.